Figure 1:
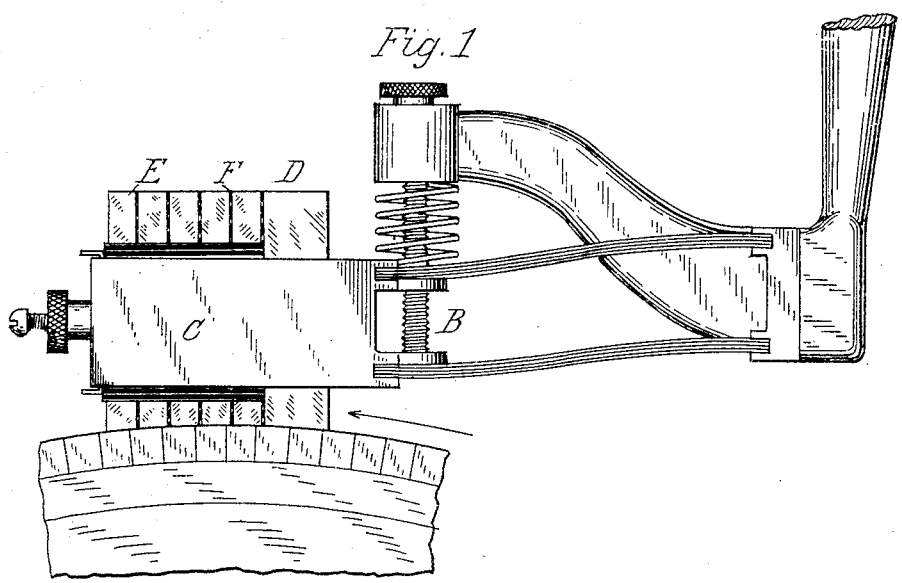

No. 783,999. PATENTED FEB. 28, 1905.
G. S. DUNN.
APPARATUS FOR THE COMMUTATION OF DIRECT CURRENT DYNAMO ELECTRIC MACHINES.
APPLICATION FILED JUNE 26, 1902. RENEWED SEPT. 12, 1904.

2 SHEETS—SHEET 1.

Witnesses:
Edward J. Murphy.
Geo. L. Wheeler.

Inventor:
Gano S. Dunn
by Thomas Ewing, Jr.
Attorney.

No. 783,999. PATENTED FEB. 28, 1905.
G. S. DUNN.
APPARATUS FOR THE COMMUTATION OF DIRECT CURRENT DYNAMO ELECTRIC MACHINES.
APPLICATION FILED JUNE 26, 1902. RENEWED SEPT. 12, 1904.

2 SHEETS—SHEET 2.

Witnesses:
Edward J. Murphy.
Geo. L. Wheelock.

Inventor:
Gano S. Dunn
by Thomas Ewing, Jr.,
Attorney.

No. 783,999.

Patented February 28, 1905.

UNITED STATES PATENT OFFICE.

GANO S. DUNN, OF AMPERE, NEW JERSEY, ASSIGNOR TO CROCKER-WHEELER COMPANY, OF AMPERE, NEW JERSEY, A CORPORATION OF NEW JERSEY.

APPARATUS FOR THE COMMUTATION OF DIRECT-CURRENT DYNAMO-ELECTRIC MACHINES.

SPECIFICATION forming part of Letters Patent No. 783,999, dated February 28, 1905.

Original application filed May 7, 1902, Serial No. 106,318. Divided and this application filed June 26, 1902. Renewed September 12, 1904. Serial No. 224,179.

*To all whom it may concern:*

Be it known that I, GANO S. DUNN, a citizen of the United States of America, and a resident of Ampere, Essex county, New Jersey, have invented certain new and useful Improvements in Apparatus for the Commutation of Direct-Current Dynamo-Electric Machines, of which the following is a specification.

The armature-coils of direct-current dynamo-electric machines may be divided into three classes, namely: first, those approaching a brush; second, those receding from a brush, and, third, those in contact with a brush. The current in the approaching and the receding coils is equal, but opposite in direction. The accomplishment of the reversal of the coils in their turn on passing the brush is called "commutation." The success of the commutation is determined by its complete accomplishment before the leading terminal of a coil leaves the brush. When commutation is not accomplished properly, the coil that is to take its place with the receding coils has not been brought into a corresponding electrical condition at the instant when it is inserted into the path of the current through the receding coils, and the sudden enforcement of this correspondence at the moment the commutator-bar leaves the brush causes a spark or burning of the brush and bar, which generates heat and in time destroys the smooth surface of the commutator, causes abnormal wear, reduces the efficiency of the machine, and makes its operation uncertain.

In the discussion of the various methods of commutation which follows it will be assumed for simplicity that the current flows from the brush into the coil under consideration and that the commutator is moving under the brush from right to left.

There are several means of effecting commutation. Among these are shifting the brushes toward one of the magnetic poles of the machine, so that the commutation will take place in a region where the coil is influenced by the magnetic field. By generating in a coil while its terminals are short-circuited by a brush a local electromotive force this field causes the rapid dying out of the current originally flowing and the building up of current in the opposite direction. By the time the leading terminal is ready to pass out from under the brush the electrical condition of the coil is so nearly like that of the receding coils that at the moment of its being inserted into the path of the current through the receding coils there is no disturbance.

Other means of effecting commutation are special forms of winding, whereby a neutralizing and reversing electromotive force is generated in the leads connecting the coil with the commutator-bars to accomplish the reversal of the commutating-coil, this electromotive force being produced by magnets separate from the field-magnets or by carrying a lead under one of the poles of the machine in its path between the coil and a commutator-bar.

The above-described means and various known modifications thereof all belong to what I term "magnetic commutation." The reversal is accomplished by an electromotive force generated in the commutating-coil or some part of its local circuit when short-circuited by the brush.

There is a second generic method of commutation which I call "resistance" commutation, since it accomplishes the reversal of the current in the commutating-coil by offering alternative paths by which the current may reach the terminals of the commutating-coil, the relation of resistances in these paths being rapidly changed, as the terminals of the commutating-coil pass through the region of the brush-contact in such manner as to tend to cut off the current entering the leading terminal and to facilitate passage of current from the brush into the trailing terminal of the coil. With substances of high resistivity and contact resistance, as where carbon or graphite brushes are employed, there is a strong throttling effect exerted upon the current passing into the leading terminal of the commutating-coil as the overlap between the brush and the commutator-bar of the leading terminal is diminished which tends to cut off current from going into the bar of the leading terminal, and thereby to establish the full amount of the normal current in the coil from the bar connected with the trailing terminal before the bar connected with the leading terminal of the coil passes out of contact with the brush. At the moment, therefore, when the leading terminal of the coil is disconnected from the brush and the coil is inserted into the path of the current through the receding coils there is no troublesome shock.

Most direct-current dynamo-electric machines at present in use commutate by combined magnetic and resistance methods.

For reasons that it is not necessary to enumerate the limit of commutation by these methods or combinations thereof has practically been reached, or, in other words, the limit of electrical inertia or inductance that can be overcome by commutation has been reached. This necessitates that the designing of direct-current machines for higher voltages than are now commonly employed therewith must proceed along lines of such alteration in present proportion that while the voltage is increased the inductance shall not be permitted to rise above values such as can be successfully commutated by means known to the art at the present time. This tends to extravagance in certain proportions of the machinery and not only renders its cost out of proportion to its performance, but beyond a certain point renders the construction impracticable. No suitable substance has been found the resistivity and contact resistance of which is higher than that of carbon and its modifications, and the prospects of development along this line are not promising.

My invention without diminishing the value of magnetic commutation increases indefinitely the effectiveness of resistance commutation, so that much higher voltages than are now commonly employed with direct-current dynamo-electric machinery can be successfully employed. It also enables very important changes to be made in the structure of machines attended by reduction of cost.

The method disclosed in this application is claimed in a copending application filed May 7, 1902, Serial No. 106,318, of which the present application is a division.

My invention consists of a commutator-brush made up of a live brush and a number of dead brushes at one side of the live brush and operating in conjunction therewith.

I have shown the invention applied to simple multiple circuit or loop windings; but it is equally applicable to what are known as "two-circuit" or "wave" windings and to the various modifications of each of these classes of windings.

Figure 2:
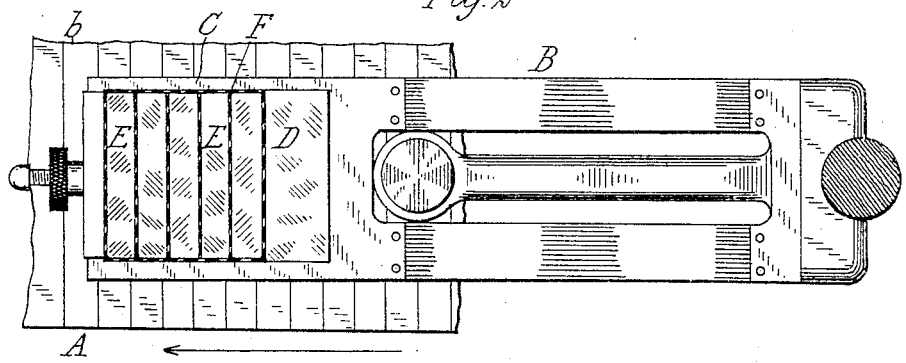
Figure 3:
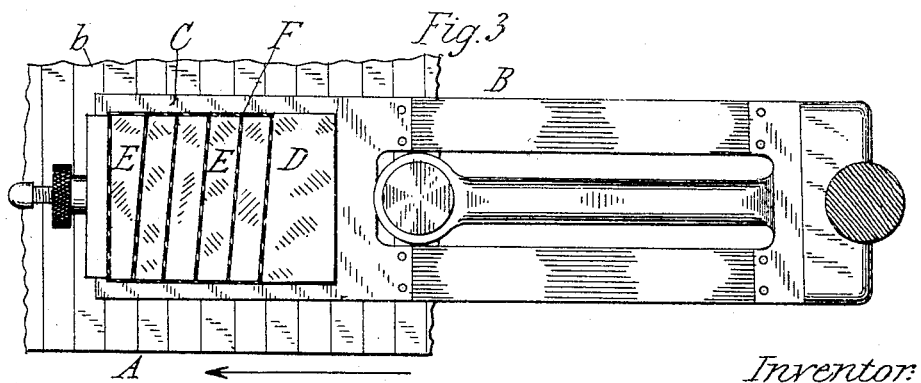
Figure 4:
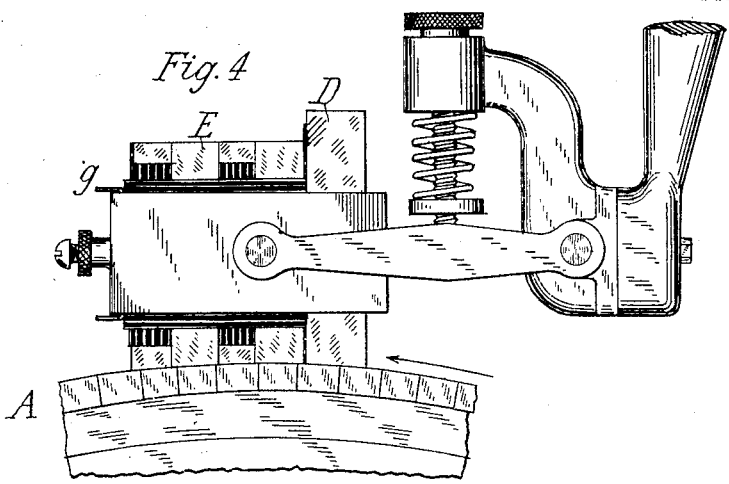
Figure 5:
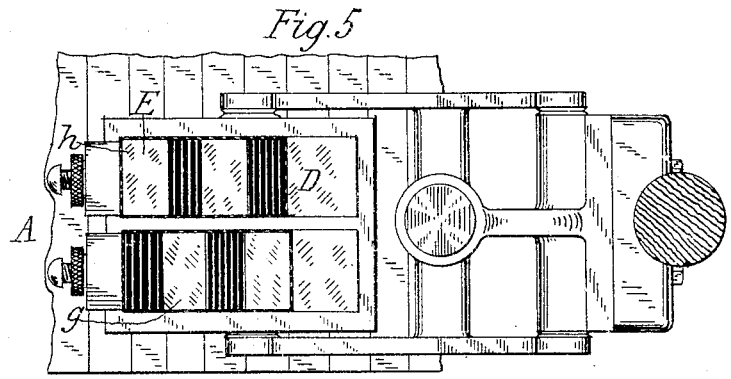

In the accompanying drawings, which form a part of my specification, Figure 1 is a side elevation showing portions of a commutator and a brush-holder with my improved brush applied. Fig. 2 is a plan view of the same parts. Fig. 3 is a plan view of a modification in which the insulation between the dead brushes is slanting with respect to the commutator-bars. Fig. 4 is a side view of a further modification in which the brushes overlap one another. Fig. 5 is a plan view of the same, and Fig. 6 is a diagram showing approximately the operation of the invention.

Referring to Figs. 1, 2, and 3, the commutator A is supposed to revolve in the direction of the arrow. The brush-holder B, of any suitable construction, supports a brush in its socket C. The ordinary brush D, of carbon or graphite or other suitable material, is supported in the socket as usual, so as to form electrical contact with the commutator-bars $b$, connected with the commutating-coils $d$. (Shown only in Fig. 6.) Located in the socket C on the trailing side of the live brush D is a plurality of brushes E, of carbon or graphite or other suitable material, which are insulated from each other and from the live brush by suitable insulation F, such as sheets of mica, paper, or equivalent insulation, that may be wrapped around the brushes E so as to inclose them. The brushes E are insulated not only from the live brush and its holder, but from every other part of the machine, so that they are completely dead except for their contact with the commutator-bars. Hence they are called "dead" brushes.

The progress of a coil in commutation by my method—that is to say, the electrical connections and condition of a coil as it occupies successively the positions of coils $a$, 1, 2, 3, 4, 5, 6, 7, and $r$—will now be discussed.

Figure 6:
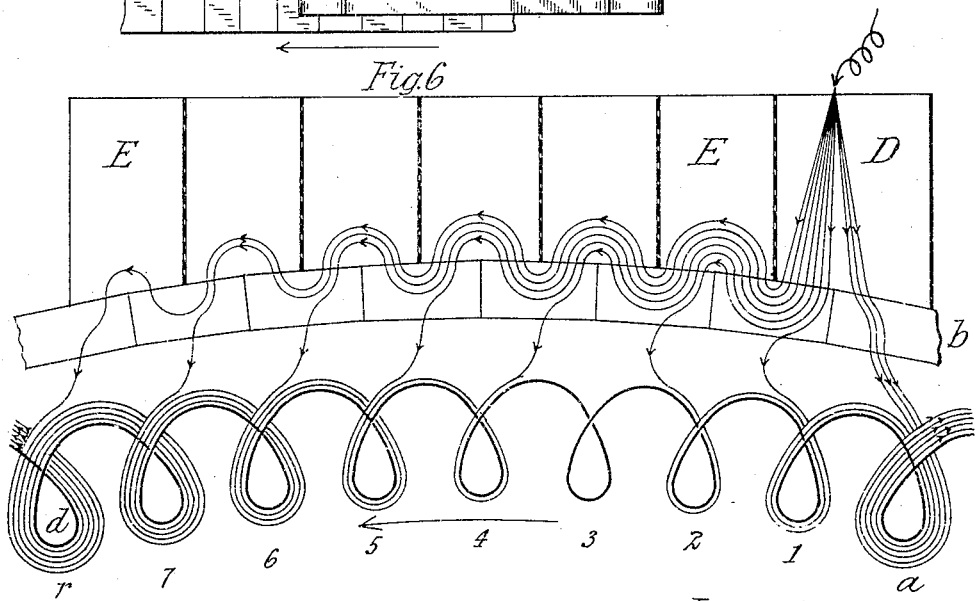

Referring to the diagram Fig. 6, coil $a$ is receiving current from its left-hand or leading terminal, which flows out at the right-hand or trailing terminal and into the coils to the right. The direction and strength of this current are the same as that which is in the neighboring approaching coils. When the coil $a$ reaches the position of the coil 1, it is short-circuited through the live brush; but owing to its inductance current continues to flow in the same direction as before, although of a diminished value. When the coil $a$ reaches position 2, it is short-circuited through a dead brush. Its advancing terminal is connected to the live brush D through the dead brush E, and its trailing terminal is connected to the live brush D directly and also through coil 1. In each of these three connections there is one brush-to-commutator contact from the live brush. Since the contact between the live brush and the commutator is common to all of the circuits shown in the drawings, it will not be further referred to. Also while the neutral point is shown as at position 3 it may be located farther to the right or to the left.

Considering now coil $a$ when in position 2, current tends to flow from the live brush in at the trailing terminal; but this, which would effect a reversal of the coil, is opposed by the self-induction thereof. Current also tends to flow from the live brush and in at the leading terminal; but this is opposed by the two additional surface contacts between the commutator-bar and the first dead brush and this brush and the next commutator-bar. As the coil $a$ moves to the left the number of these surface contacts between the live brush and the leading terminal increases step by step, there being two added contacts for each dead brush—that is, the facility of receiving current at the leading terminal is progressively diminished because of the increasing number of contact-surfaces through which such current has to pass. On the other hand, the facility of receiving current at the trailing terminal from the coils to the right is not diminished. This tends to reverse the coil gradually or in steps corresponding to the number of dead brushes. This I term "fractional commutation."

In order to obtain full benefit of the dead brushes, their pitch should be approximately that of the commutator-bars—that is to say, the distance between the centers of the dead brushes should be practically that between the centers of the commutator-bars. If, for example, the pitch of the dead brushes should be half that of the commutator-bars, there would be positions where two dead brushes cover one bar and only one pair of contact-surfaces would be effective instead of two. If the pitch of the dead brushes were intermediate between one-half of the pitch and the full pitch of the commutator-bars, then a portion of the brushes—less than half—would be rendered useless in certain relative positions of the commutator-bars and the brushes. The case is similar if the brush-pitch exceeds the bar-pitch.

To state concisely my method of commutation, it may be said that when the coil is short-circuited through the brush there is a moment at which the contact resistance is balanced at the two terminals of the coil and that the resistance is thereafter progressively increased on one side and not increased on the other—that is to say, after the moment at which the resistance is balanced at the two terminals of the coil the resistance at the leading terminal is progressively augmented by the addition of contact resistance while the inductive reactance of the coils is dying away. In this way a path of current with maximum resistance is formed which departs from and returns a multiplicity of times into the commutator-surface. By following the pitch described I am enabled to extend this effect indefinitely. An effect to be noted due to this method of commutation is that not only into the advancing terminal of one but into the advancing terminals of a number of successive coils a gradually-increasing resistance is introduced in such a way that at each terminal a resistance of different amount to that at any other terminal is produced at a given time, forming as many paths of current as there are different resistances.

It will be understood that each dead brush may be compound—that is, composed of a number of non-insulated parts.

In Fig. 3 the planes of separation between the brushes are inclined relatively to the planes of separation between the commutator-bars for the purpose of preventing an instant of absolute rupture of the commutating-current when the trailing side of the live brush leaves the commutator-bar, thereby avoiding a spark or burning of the bar. Another alternative means for accomplishing this end is shown in Figs. 4 and 5, in which the dead brushes are arranged in two series $g$ $h$, the brushes being also staggered relatively to each other, so that a dead brush in one series partly overlaps a dead brush of the other series, while the live brush is divided into two parts, one being thicker than the other, so that one of the dead brushes may partly overlap it. Each series of dead brushes is not only insulated from the other series, but the individual dead brushes are insulated from each other, as in the main form of the invention.

It is obvious that for reversing motors dead brushes will be located at both sides of the live brush.

Without limiting myself to the details shown, what I claim, and desire to secure by Letters Patent of the United States, is—

A commutator-brush made up of a live brush and a number of dead brushes at one side of the live brush and operating in conjunction therewith, substantially as described.

Signed by me at Ampere, New Jersey, this 20th day of June, 1902.

GANO S. DUNN.

Witnesses:
F. V. HENSHAW,
H. J. FULLER.